Patented Sept. 14, 1948

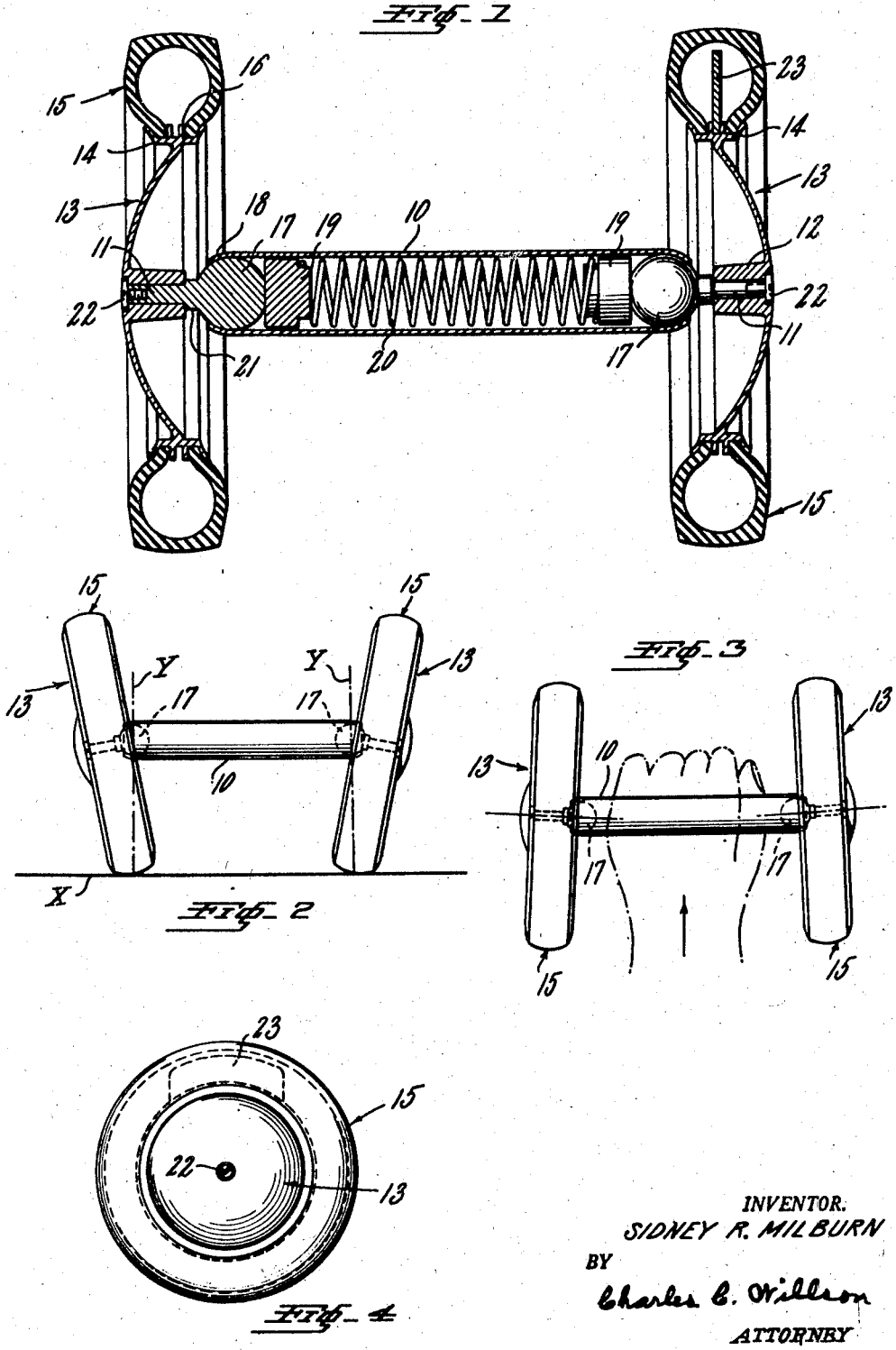

2,449,499

UNITED STATES PATENT OFFICE 2,449,499

DEVICE FOR DEMONSTRATING THE ACTION OF THE FRONT WHEELS OF AUTOMOBILES

Sidney R. Milburn, Mountain View, N. J., assignor to United States Rubber Company, New York, N. Y., a corporation of New Jersey Application May 9, 1947, Serial No. 746,932

4 Claims. (Cl. 35—13)

This invention relates to a miniature device for physically demonstrating the running action of the front wheels of a motor vehicle under different conditions of adjustment.

Most abnormal wear of the front tires of a motor vehicle is caused by the misaligned and unbalanced wheels upon which the tires are mounted.

The proper setting of the front wheels of an automobile, bus or truck requires that several different conditions be met. It is hard to explain clearly to others what these conditions are unless equipment is available to illustrate how the front wheels of a motor vehicle run along a road under different conditions of adjustment. The present invention therefore contemplates a miniature device of simple construction that can be easily adjusted to illustrate how the wheels act in running along a surface when they are set at different angles to each other.

The device of the present invention is extremely well adapted to illustrate in a simple manner, (1) the mechanism of wheel alignment and (2) the importance of wheel balance.

In order to have even a rudimentary knowledge of the problems involved in wheel alignment for motor vehicles it is necessary to keep in mind that due to gravity weight exerts its force downward in a vertical direction, and that the weight of a motor vehicle is carried vertically above the point where the tire contacts the road. This location of the load point can be changed by tilting the front wheels in a vertical plane and is known as "camber." This tilting of the wheels called camber is the means employed by the car manufacturer to decrease the wear on the wheel bearings and the wheel spindle or short axle. Usually the front wheels of an automobile are given positive camber, which means that the wheels tilt outwardly at the top. Negative camber means that the wheels tilt inwardly at the top.

It is apparent that too much camber will cause the outside half of the tire tread to do all the work and that this will produce rapid wear upon this portion of the tire. Conversely too much negative camber will cause excessive wear upon the inner edge of the tire. It will therefore be seen that camber or the tilting of the front wheels in a vertical plane has an important bearing on the rate of tread wear or miles of service that can be secured from the front tires.

The tilting of the front wheels so that they are closest together forward of the axle, which is known as "toe-in," or closest together at the rear of such axle, which is known as "toe-out," also has an important bearing on the rate of tread wear. The main purpose of toe-in is to eliminate the tendency of the wheels to work or weave towards and from each other in front of the axle, as a result of any play in the connections between these wheels. The wear caused by excessive toe-in or toe-out can usually be readily identified by visual inspection of the tire tread where it shows up by producing a sharp edge at one side of the tread, and a slight error in the toe angle in either direction will produce rapid tire wear.

The foregoing deals briefly with the more important problems concerning wheel alignment, but wheel balance is also important. This is the combination of the balance of the wheel, brake drum, tire and tube, and it is highly desirable that the entire assembly be balanced as a unit. The balance of such a unit falls into two phases, static balance and dynamic balance. Static balance in a wheel assembly pertains to the equal distribution of inert weight between opposite points, and if the wheel is out of static balance and is supported clear of the ground it will rotate under the influence of gravity until the heavy portion of the wheel lies near the ground. Dynamic balance pertains to the proper distribution of the centrifugal force created by the motion of the wheel, and the lack of dynamic balance of a wheel becomes more noticeable as the speed at which the wheel is rotated increases.

The present device for demonstrating how to set properly the front wheels of a motor vehicle is sufficiently small and light in weight to be easily manipulated with one hand, after the wheels have been tilted to any desired angle, to illustrate how the tires roll along a supporting surface when set to give positive camber or negative camber or to cause the wheels to toe-in or toe-out. This device may also be employed to illustrate forcibly how a wheel which is out of dynamic balance vibrates when it is rotated rapidly.

The various features of the demonstrating device of the present invention will be further understood from the following description when read in connection with the accompanying drawing showing one good practical embodiment of such device, and wherein;

Fig. 1 is a vertical sectional view of the demonstrating device;

Fig. 2 is a side view of the same device showing the wheels set to produce positive camber;

Fig. 3 shows how the device of Fig. 1 may be rolled forward by one hand on a supporting surface to illustrate the toe-in action of the wheels; and Fig. 4 is a face view of the weighted wheel shown in Fig. 1.

The device of the present invention for demonstrating the action of the front wheels of a motor vehicle may be made in various sizes, but it has been found in practice that if the main axle 10 is made about six inches long it can be conveniently grasped in one hand as shown in Fig. 3 of the drawing. The axle 10 is preferably made from a piece of metal tubing such as an aluminum pipe, and the tubular axle 10 has provided at each end thereof a wheel spindle or short axle 11. Upon this spindle is rotatably mounted the hub 12 of the metal wheel 13 having the tire rim 14 upon which is mounted the rubber tire 15, and the rim 14 is preferably provided with the slightly spaced annular ribs 16 which help to keep the bead portions of the tire spaced.

The spindles 11 are secured to the opposite ends of the tubular axle 10 by friction universal joints preferably formed of a ball and socket joint in which the ball 17 is an integral portion of the spindle 11 as shown. The ball 17 should be slightly smaller in diameter than the inner diameter of the tube 10 and is conveniently prevented from escaping from the end of such tube by spinning the end portion of the tube inwardly as indicated at 18 to reduce the size of the opening of the end of the tube.

The ball 17 is preferably held frictionally seated against the annular lip 18 with sufficient pressure to cause the spindle 11 to remain in any position to which it may be adjusted manually. To this end in the construction shown a thick metal disk 19 is provided within the tubular axle 10 near each end thereof to rest against the ball 17, and an outward pressure is exerted on these disks 19 by a coiled spring 20 confined therebetween to hold the disks 19 in frictional engagement with the balls 17.

The inner end of each hub 12 rests against a shoulder 21 provided upon the spindle 11 and the wheel is rotatably secured upon the spindle by the head of a screw 22 screwed into the outer end of the spindle 11, the construction being such that each wheel 13 will rotate freely on its spindle or short axle 11.

An important use of the demonstrating device of the present invention is to illustrate the wear to which the tires 15 are subjected when the front wheels are misaligned or out of balance, and as a result of the construction of the present invention the wheels 13 may be quickly tilted to any desired angle with respect to the main axle 10 so as to illustrate the effect of positive and negative Camber and also the effect of toe-in and toe-out setting, and the friction action of the ball and socket joints should be sufficient to cause the spindles to remain in the tilted position to which they are set while the axle 10 is grasped in the hand as shown in Fig. 3 and the wheels are rolled along a flat surface.

Fig. 2 of the drawing shows what is known as positive camber in which the wheels 13 tilt outwardly at the top. The effect of this is to cause the tires to contact the road indicated by the lines X at a point approximately directly below the center of the ball 17 as indicated by the dot and dash lines Y. It will be seen that when the wheels are given positive camber as shown in Fig. 2 the outer portion of the tire will be subjected to the greatest wear, but this is not serious unless the inclination of the wheels is excessive, furthermore if the wear becomes much greater on the outer portion of the tire than on its inner portion the tire should be shifted.

Fig. 3 shows the wheels 13 as set with a toe-in adjustment, assuming that where they are closest together is in front of the axle and that when the hand moves in the direction indicated by the arrow they will roll in a forward direction. If the wheels are rolled forward along a surface by grasping the axle 10 in the hand and moving the hand in the direction of the arrow in Fig. 3 the fact that this toe-in produces wear upon the tires, depending upon the degree of toe-in, can be readily observed.

It will be seen from the foregoing that the demonstrating device of the present invention is well adapted to illustrate the action of improper adjustment or alignment of the front wheels of a motor vehicle, and the fact that misalignment causes rapid wear of the tires.

The present device may also be employed to illustrate how an unbalanced wheel acts when rotated rapidly, and to this end the right hand wheel shown in Fig. 1 of the drawing has secured to its rim 14 a weight 23 such as a piece of lead of substantial size that extends outwardly into the hollow interior of the tire 15, and is conveniently secured in place by crimping the ribs 16 towards each other to grip the weight 23 therebetween. If the axle 10 of the demonstrating device is grasped in the hand as shown in Fig. 3 so that the wheels 13 are held clear of a supporting surface, and then the weighted wheel 13 is rotated rapidly the unbalanced condition of this wheel will be very noticeable since it will cause the tire demonstrating device to vibrate with considerable force.

It will be seen from the foregoing that while the demonstrating device of the present invention is so small that it can be easily manipulated with one hand it will, nevertheless, serve very effectively to illustrate how misaligned or unbalanced wheels adversely affect the wear of the tires mounted on such wheels.

Having thus described my invention what I claim and desire to protect by Letters Patent is:

1. A device for demonstrating the effect of correct and incorrect alignment of the front wheels of a motor vehicle and the action of camber and toe-in, comprising an axle a few inches long, a short spindle secured at each end of the axle with a ball and socket friction joint that permits each spindle to be moved to various angles relatively to the axle and be retained by such friction in the adjusted positions, and a wheel and tire upon each spindle, whereby when the axle is grasped in the hand and advanced to roll the tires upon a flat surface the manner in which the tires roll upon the surface under different wheel settings will be demonstrated.

2. A device for demonstrating the effect of correct and incorrect alignment of the front wheels of a motor vehicle and the action of camber and toe-in, comprising an axle a few inches long, a short spindle secured at each end of the axle with a friction universal joint that permits each spindle to be moved to various angles relatively to the axle and be retained by such friction in the adjusted positions, and a wheel and tire upon each spindle, whereby when the axle is grasped in the hand and advanced to roll the tires upon a flat surface the manner in which the tires roll upon the surface under different wheel settings will be demonstrated.

3. A miniature device for demonstrating the effect of correct and incorrect alignment of the front wheels of a motor vehicle and the action of camber and toe-in, comprising a hollow axle, a short spindle secured at each end of the axle with a ball and socket joint that permit each spindle to be tilted to various angles, a spring confined within the axle and operable to exert friction pressure on the spindle balls to retain them in the adjusted positions, and a wheel and tire upon each spindle, whereby when the axle is grasped in the hand and advanced to roll the tires upon a surface the manner in which the tires roll upon the surface under different wheel settings will be demonstrated.

4. A miniature device for demonstrating the effect of correct and incorrect alignment and unbalance on the front wheels of a motor vehicle, comprising an axle, a short spindle secured at each end of the axle with a friction universal joint that permits each spindle to be moved to various angles relatively to the axle and be retained by such friction in the adjusted positions, a wheel and tire upon each spindle, an off balance weight secured to one of the wheels, whereby when the axle is grasped in the hand and advanced to roll the tires upon a flat surface the manner in which the tires roll upon the surface will be demonstrated and when the unbalanced wheel is rotated rapidly it will vibrate with considerable force.

SIDNEY R. MILBURN.

REFERENCES CITED

The following references are of record in the file of this patent:

UNITED STATES PATENTS

| Number | Name | Date |
|---|---|---|
| 1,242,863 | Reeves | Oct. 9, 1917 |
| 2,314,076 | Casner | Mar. 16, 1943 |